United States Patent
Moyer et al.

[11] Patent Number: 6,119,240
[45] Date of Patent: *Sep. 12, 2000

[54] LOW POWER DATA PROCESSING SYSTEM FOR INTERFACING WITH AN EXTERNAL DEVICE AND METHOD THEREFOR

[75] Inventors: William C. Moyer, Dripping Springs; Claude Moughanni, Austin, both of Tex.

[73] Assignee: Motorola, Inc., Schaumburg, Ill.

[ * ] Notice: This patent is subject to a terminal disclaimer.

[21] Appl. No.: 09/321,389

[22] Filed: May 27, 1999

Related U.S. Application Data

[63] Continuation of application No. 09/024,607, Feb. 17, 1998, Pat. No. 5,951,688, which is a continuation of application No. 08/598,833, Feb. 5, 1996, Pat. No. 5,787,291.

[51] Int. Cl.$^7$ ................................................. G06F 1/26
[52] U.S. Cl. ..................... 713/320; 713/321; 713/324; 710/129
[58] Field of Search ................. 713/310–321, 713/323–324, 330, 340; 364/707; 710/129

[56] References Cited

U.S. PATENT DOCUMENTS

| | | | |
|---|---|---|---|
| 3,435,375 | 3/1969 | Miller | 331/110 |
| 3,854,057 | 12/1974 | Williams et al. | 307/255 |
| 4,432,049 | 2/1984 | Shaw et al. | 364/200 |
| 4,567,385 | 1/1986 | Falater et al. | 307/443 |
| 4,695,740 | 9/1987 | Carter | 307/242 |
| 4,719,369 | 1/1988 | Asano et al. | 307/443 |
| 4,761,647 | 8/1988 | Hallenbeck et al. | 340/825.22 |
| 4,791,322 | 12/1988 | Graham et al. | 307/475 |
| 4,806,802 | 2/1989 | Okitaka et al. | 307/542 |
| 4,839,537 | 6/1989 | Ueno | 307/446 |
| 4,853,560 | 8/1989 | Iwamura et al. | 307/296.1 |
| 4,855,623 | 8/1989 | Flaherty | 307/475 |
| 4,877,978 | 10/1989 | Platt | 307/473 |
| 4,975,598 | 12/1990 | Borkar | 307/443 |
| 5,039,874 | 8/1991 | Anderson | 307/270 |
| 5,059,830 | 10/1991 | Tokumaru et al. | 307/481 |
| 5,063,308 | 11/1991 | Borkar | 307/443 |
| 5,107,230 | 4/1992 | King | 333/32 |
| 5,134,311 | 7/1992 | Biber et al. | 307/270 |
| 5,140,194 | 8/1992 | Okitaka | 307/473 |
| 5,432,950 | 7/1995 | Sibigtroth | 395/425 |
| 5,457,802 | 10/1995 | Caterwood et al. | 395/775 |
| 5,535,404 | 7/1996 | Tsubota | 395/800 |
| 5,584,031 | 12/1996 | Burch et al. | 395/750 |
| 5,606,715 | 2/1997 | Yishay et al. | 395/800 |
| 5,617,559 | 4/1997 | Le et al. | 395/496 |
| 5,652,844 | 7/1997 | Harwood, III | 395/284 |
| 5,664,168 | 9/1997 | Yishay et al. | 395/559 |
| 5,787,291 | 7/1998 | Moyer et al. | 713/320 |
| 5,951,688 | 9/1999 | Moyer et al. | 713/320 |

*Primary Examiner*—Ayaz R. Sheikh
*Assistant Examiner*—Raymond N Phan

[57] ABSTRACT

A data processor (10) flexibly interfaces with both a variety of memory devices and external peripheral devices. A control register (94) is provided for dynamically controlling an electrical interface configuration of the data processor. A set of bits (DA) in the control register (94) provides configuration control which indicates a voltage level of data communicated with the data processor.

5 Claims, 5 Drawing Sheets

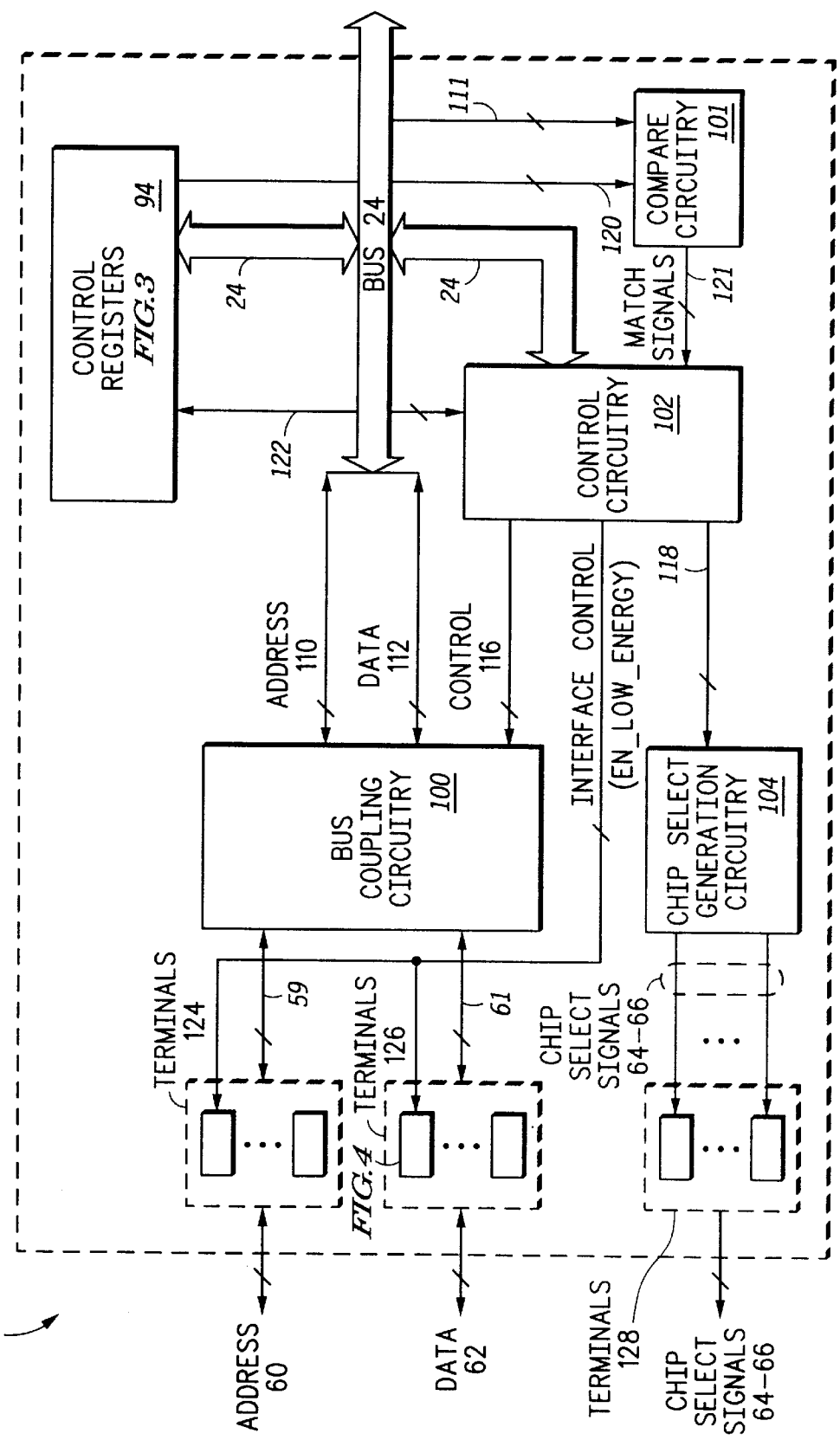

FIG. 3

| | 31-15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|
| R | 0 | | WSC | | | DA | | | EBC | | DSZ | | WP | PF | PA | CSEN |
| W | | | | | | | | | | | | | | | | |
| RESET | | | 0 | | | | | | | | | | | | 0 | 0 |

300

| | 31-15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|
| R | 0 | | WSC | | | DA | | | EBC | | DSZ | | WP | PF | PA | CSEN |
| W | | | | | | | | | | | | | | | | |
| RESET | | | 0 | | | | | | | | | | | | 0 | 0 |

400

94

LOW POWER DATA PROCESSING SYSTEM FOR INTERFACING WITH AN EXTERNAL DEVICE AND METHOD THEREFOR

This application is a continuation of Ser. No. 09/024,607 now U.S. Pat. No. 5,951,688 filed Feb. 17, 1998, which is a continuation of Ser. No. 08/598,833 now U.S. Pat. No. 5,787,291 filed Feb. 5, 1996, all applications and patents assigned to assignee hereof and which is hereby incorporated herein by reference, and priority thereto for common subject matter is hereby claimed.

FIELD OF THE INVENTION

The present invention relates in general to a data processing system, and more particularly to a method and apparatus for interfacing with an external device in a low power data processing system.

BACKGROUND OF THE INVENTION

As society becomes increasingly mobile, technology has kept pace with portable computers, cellular phones, and pagers. With the burgeoning use of such electronic devices, manufacturers have called upon the semiconductor industry to provide data processors which process information as quickly as possible while requiring minimum power consumption and minimum circuit area. In response, the semiconductor industry has labored to develop data processors which consume less power in both active and idle states.

When the data processor is operating in an active state, communications between the data processor and other devices typically comprise a substantial portion of the total power consumed by the data processor. Such significant power consumption is due to the relatively large capacitances (loads) which the data processor must drive when communicating with an external device. These large capacitances are generally difficult to reduce and proportionally increase an amount of power consumed by an entire system. In fact, power consumption is proportional to a capacitance value multiplied with a squared voltage value and a frequency (Power $CV^2f$). Because the capacitances may be only decreased slightly, a voltage level which must be driven across such capacitances should be minimized to lower the amount of power consumed by the application using the data processor. However, the voltage level of the data communicated by the data processor is dictated by a voltage level required by the external device. For example, some external devices require an input voltage level of 5 volts, while other external devices require an input level of only 2.5 volts. Additionally, when more than one external device is included in an application, prior art implementations of data processors have provided all data at the highest voltage level required by any one of the external devices. Therefore, more power is consumed because the voltage level of data provided by the data processor to all external devices must be at a highest level and is not optimized on a device by device basis.

BRIEF DESCRIPTION OF THE DRAWINGS

FIG. 2 illustrates in block diagram form a portion of a system integration unit of the data processing system of FIG. 1;

FIG. 3 illustrates in tabular form a portion of a plurality of control registers of FIG. 2 in accordance with one embodiment of the present invention;

FIG. 4-1 illustrates in circuit diagram form one of the plurality of integrated circuit terminals of FIG. 2 in accordance with a first embodiment of the present invention;

FIG. 4-2 illustrates in circuit diagram form one of the plurality of integrated circuit terminals of FIG. 2 in accordance with a second embodiment of the present invention;

DESCRIPTION OF THE PREFERRED EMBODIMENTS

The present invention provides a data processor and method of operating a data processing system which allows a user great flexibility in selecting both a variety of memory devices and external peripheral devices that will interface with the data processor. In the data processor, a control register is provided for dynamically controlling a plurality of integrated circuit terminals which receive data from the external peripheral devices. Stated another way, the present invention allows the user to dynamically change the electrical interface specifications to be used in a data transfer between the data processor and a selected one or more of the plurality of external peripheral devices. Furthermore, the present invention includes this first set of bits in a chip select register which is selectively accessed on a timing cycle by timing cycle basis. As the data processing system accesses an external device, a corresponding chip select register is also accessed to provide proper timing and control information to the external device. Therefore, at each timing cycle, a different chip select register and different timing and control information may be accessed. In the present embodiment of the invention, the ability to select a value controlling the electrical interface between the data processor and an external device dynamically and in response to a memory location currently being accessed provides a user with greater functional flexibility while decreasing power consumption.

In a following discussion, the connectivity and operation of one embodiment of a data processing system which implements the present invention will be provided in greater detail.

CONNECTIVITY OF THE PRESENT INVENTION

In the following description of the connectivity of the present invention, the term "bus" will be used to refer to a plurality of signals or conductors which may be used to transfer one or more various types of information, such as data, addresses, control, or status. The terms "assert" and "negate" will be used when referring to the rendering of a signal, status bit, or similar apparatus into its logically true or logically false state, respectively. If the logically true state is a logic level one, the logically false state will be a logic level zero. And if the logically true state is a logic level zero, the logically false state will be a logic level one.

Furthermore, brackets will be used to indicate the conductors of a bus or the bit locations of a value. For example, "bus 60 [0–7]" or "conductors [0–7] of bus 60" indicates the eight lower order conductors of bus 60, and "address bits [0–7]" or "ADDRESS [0–7]" indicates the eight lower order bits of an address value. The symbol "$" preceding a number indicates that the number is represented in its hexadecimal or base sixteen form. The symbol "%" preceding a number indicates that the number is represented in its binary or base two form.

Figure 1:
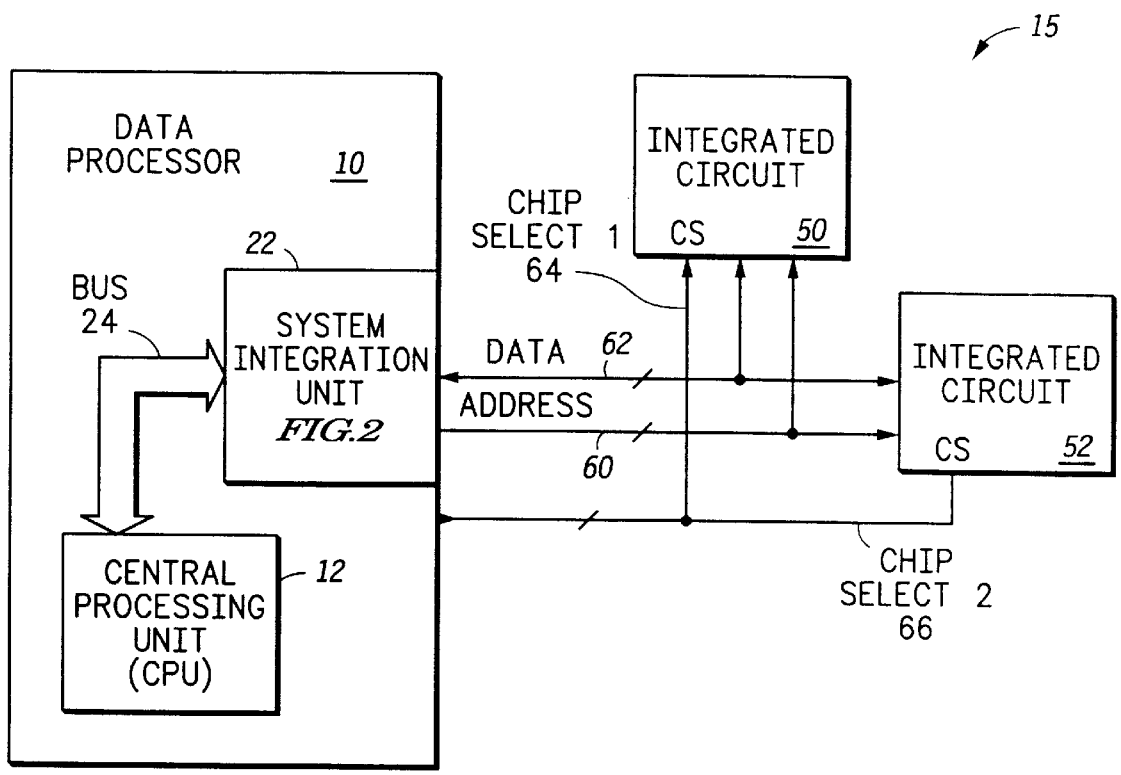
FIG. 1 illustrates in block diagram form a data processing system in accordance with one embodiment of the present invention.

Referring now to FIG. 1, FIG. 1 illustrates a data processing system 15 having a data processor 10, an integrated circuit 50, and an integrated circuit 52. Data processor 10 includes a central processing unit (CPU) 12 and a system integration circuit 22. In one embodiment of the present invention, data processor 10, integrated circuit 50, and integrated circuit 52 are each implemented as separate integrated circuits. In alternate embodiments of the present invention, all of data processing system 15 may be implemented on a single integrated circuit.

In FIG. 1, data processor 10 is coupled to integrated circuit 50 and integrated circuit 52 by an Address bus 60 and by a Data bus 62. A chip select (CS) input of integrated circuit 50 is coupled to data processor 10 by a Chip Select1 signal 64. A chip select (CS) input of integrated circuit 52 is coupled to data processor 10 by a Chip Select2 signal 66.

Note that in some embodiments of the present invention, data processor 10 is formed on a single integrated circuit. In some embodiment, data processor 10 is a single chip microcontroller. In alternate embodiments, data processor 10 may be implemented using any type of electrical circuitry. Integrated circuits 50 and 52 may be any type of integrated circuit, including a memory. Alternate embodiments of data processing system 15 may include more, fewer, or different external integrated circuits. In addition, although busses 60 and 62 may be implemented using any number of bits.

Figures 1, 4:
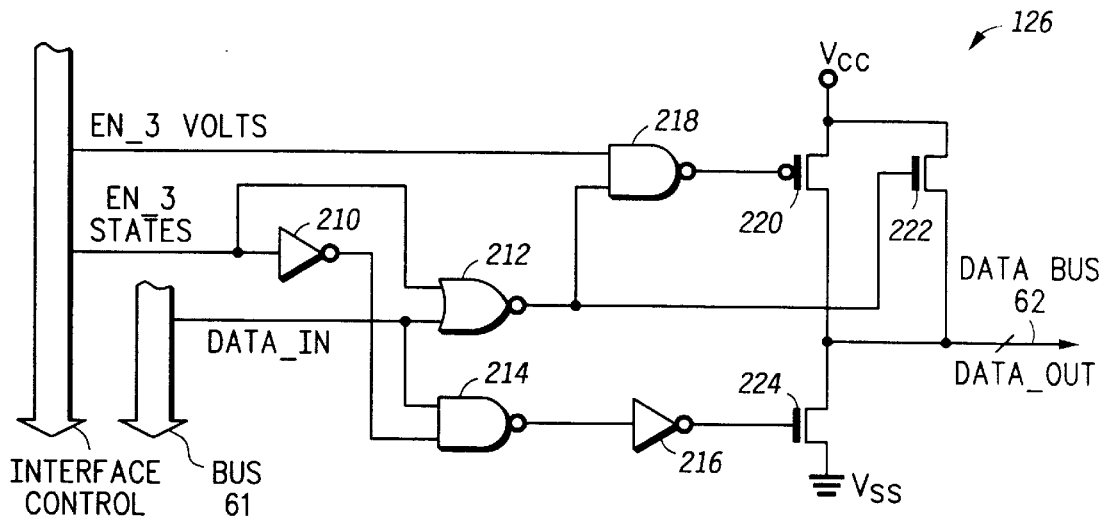
Figures 2, 4:
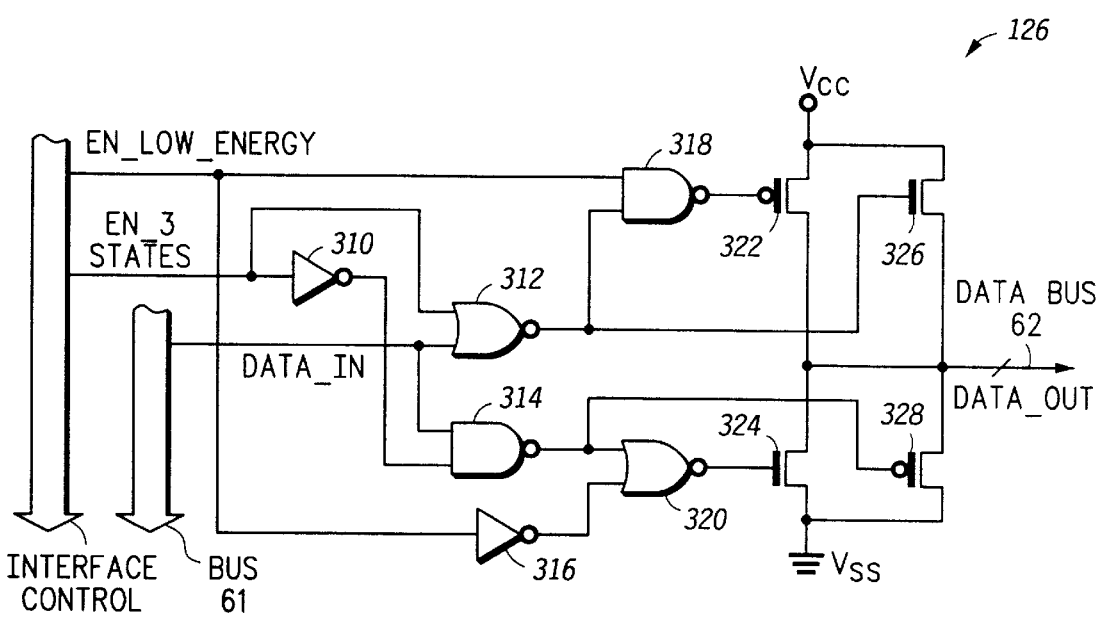

FIG. 2 illustrates a portion of system integration circuitry 22 of FIG. 1 in accordance with one embodiment of the present invention. System integration circuitry 22 includes a plurality of control registers 94, bus coupling circuit 100, compare circuitry 101, control circuitry 102, chip select generation circuitry 104, a plurality of terminals 124, a plurality of terminals 126, and a plurality of terminals 128. Bus 24 bi-directionally transfers address, data, and control information to each of control registers 94, control circuitry 102, and bus coupling circuitry 100. Address bus 110 is a portion of bus 24 which provides address bits [0–31] to bus coupling circuitry 100. Data bus 112 is a portion of bus 24 which provides data bits [0–31] to bus coupling circuitry 100. Control bus 116 provides control information from bus coupling circuitry to control circuitry 102. Note that in some embodiments of the present invention, control circuitry 102 may provide external bus cycle control signals (e.g. address strobe, data strobe, write enable, column address strobe, row address strobe, read/write, etc.) external to data processor 10 by way of one or more terminals (not shown). Bus 24 is coupled to control registers 94 such that CPU 12 may perform read and write accesses to control registers 94. Bus 24 is coupled to control circuitry 102 in order to provide and receive control information. Bus 24 is coupled to bus coupling circuit 100 by way of address bus 110 and data bus 112 in order to communicate address bits [0–31] and data bits [0–31]. And, bus 24 is coupled to compare circuitry 101 via signals 111 and 120 to provide at least a portion of address bits [0–31].

Registers 94 include a plurality of peripheral control registers in FIG. 3) and a chip select control register (not shown herein). The chip select control register includes bus loading control bits, address range bits, and other chip select control bits. Compare circuitry 101 is coupled to the chip select control register to receive the address range bits, and possibly one or more of the other chip select control bits.

Compare circuitry 101 provides compare results signals to control circuitry 102 via a plurality of conductors 121. Control circuitry 102 provides control signals to bus coupling circuit 100 by a plurality of conductors 116, and control circuitry 102 provides control signals to chip select generation circuitry 104 via a plurality of conductors 118. Control circuitry 102 also provides an Interface Control signal. The Interface Control signal is also referred to as an En_Low_Energy signal. Control circuitry 102 is bi-directionally coupled to control registers 94. In one embodiment of the present invention, control circuitry 102 receives control bits from the chip select control bits stored in control registers 94 and provides status information back to other chip select control bits. Note that in alternate embodiments of the present invention, the functionality of control circuitry 102 and bus coupling circuit 100 may be combined into one circuit.

Bus coupling circuit 100 is bi-directionally coupled to terminals 124 via an Address bus 59. Bus coupling circuit 100 is bi-directionally coupled to terminals 126 via a bus 61. Chip select generation circuitry 104 is bi-directionally coupled to terminals 128 via a plurality of chip select conductors 64 through 66. The plurality of terminals 124 are used to provide bus 59 externally to integrated circuits 50 and 52. The plurality of terminals 126 are used to provide bus 61 externally to data processor 10. And, the plurality of terminals 128 are used to provide chip select signals 64 through 66 externally to integrated circuits 50 and 52.

Integrated circuit terminals 124, 126, and 128 may be any type of apparatus which allows electrical signals to be transferred to or from data processor 10. For example, integrated circuit terminals 124, 126, and 128 may be integrated circuit terminals, solder bumps, or wire conductors. Circuitry included in each of integrated circuit terminals 124, 126, and 128 is illustrated in FIG. 4 in greater detail and will be subsequently discussed.

Referring now to FIG. 3, FIG. 3 illustrates a portion of the control registers 94 of FIG. 2 in accordance with one embodiment of the present invention. In one embodiment of the present invention, the portion of control registers 94 include a plurality of registers 300 through 400 wherein a predetermined one of the plurality of registers corresponds to a predetermined one of the plurality of chip select signals. For example, a first chip select signal corresponds to control register 300 and a last chip select signal corresponds to control register 400.

Each of the plurality of registers 300 through 400 includes a CSEN (Chip Select ENable) bit which controls an operation of a corresponding one of Chip Select signals 64 through 66. If the CSEN bit is a logic zero value for a given Chip Select signal, a corresponding integrated circuit terminal is disabled and an output is always negated. An attempt by data processor 10 to access an address mapped by the corresponding Chip Select signal will result in a transfer error and the Chip Select signal will not be asserted. When the CSEN bit is a logic one value, the corresponding integrated circuit terminal is enabled and provides an asserted Chip Select signal when an access address falls within a range corresponding to an external device and the Chip Select signal. The CSEN bit is cleared during a reset operation.

Additionally, each of the plurality of registers includes a PA (Pin Assert) bit. The PA bit is used to assert or negate an active-low output when the integrated circuit terminal corresponding to the Chip Select signal is operating as a programmable output pin. The PA bit is ignored if a PF bit is cleared or the CSEN bit is set.

Each of the plurality of registers also includes a PF (Pin Function) bit. The PF bit is used to select a function of the corresponding integrated circuit terminal. For example, when the PF bit is a logic zero value, the integrated circuit terminal is used as a chip select output. When the PF bit is a logic one value, the integrated circuit terminal is used as a programmable output control integrated circuit terminal if the CSEN bit is cleared.

Each of the plurality of registers 300 through 400 also includes a WP (Write Protect) bit. The WP bit is used to restrict write operations to an address range defined by a corresponding Chip Select signal. When the WP bit is a logic zero value, write operations are allowed in the address range defined by the corresponding Chip Select signal. When the WP bit is a logic one value, write operations are prohibited. If data processor 10 attempts to write to an address mapped by the corresponding Chip Select signal, a transfer error is sent to CPU 12 and the Chip Select signal is remains negated.

The DSZ (Data Port Size) bits illustrated in FIG. 3 define a data bit width of a device data port as well as a plurality of integrated circuit terminals which will comprise the device data port. The DSZ bits indicate both a length of a data value and a portion of the plurality of integrated circuit terminals which will communicate the value. For example, the DSZ bits may indicate which byte lane an eight bit data values may be located or which half of the data bus a sixteen bit data value may be located.

The EBC (Enable Byte Control) bit indicates which access types should assert a plurality of Enable Byte signals (not illustrated herein). When any one of the Enable Byte Control bits is a logic zero value, read and write accesses by data processor 10 are allowed to assert a corresponding one of the plurality of Enable Byte signals. Thus, when the EBC bits are a logic zero value, a corresponding Enable Byte signal is configured to operate as a byte enable. However, when any one of the Enable Byte Control bits is a logic one value, only write accesses by data processor 10 are allowed to assert a corresponding one of the plurality of Enable Byte signals. Therefore, when the EBC bits are a logic one value, the corresponding Enable Byte signal is configured to operate as a write enable. The EBC bits may be configured differently for each of the plurality of registers 94 and, therefore, for each of the plurality of Chip Select signals.

Each of the plurality of registers 94 also includes a DA (Driver Attributes) value which is used to indicate device specific electrical interface attributes. For example, when the DA value is %000, the interface will provide data having a voltage swing of 2 volts. Similarly, when the DA value is %001, the interface will provide data having a voltage swing of 3 volts and when the DA value is %010, the interface will provide data having a voltage swing of 4 volts. When the DA value is %011, the interface will provide data having a voltage swing of 5 volts and when the DA value is %100, the interface will provide data having a voltage swing of 6 volts. The following table will summarily illustrate the encodings of the electrical interface.

TABLE 1

| DA Bit Values | Attributes of Electrical Interface |
| --- | --- |
| 000 | 2 volts |
| 001 | 3 volts |
| 010 | 4 volts |
| 011 | 5 volts |
| 100 | 6 volts |

The plurality of registers 94 each include a WSC (Wait State Control) value which programs a number of wait states for an access to an external device connected to a Chip Select signal. In this embodiment of the invention, an encoding of 111 indicates that an external Transfer Acknowledge (TA) input signal (not illustrated herein) will be sampled to terminate a cycle. Note that a TA signal indicates when an external access has been terminated. All other encodings of the WSC bits enable an internally generated termination. When an access is internally terminated, a state of the TA signal is ignored.

Note that alternate embodiments of the present invention may use more, fewer, or different register bit fields, and each register bit field may be used for control, status, or both control and status. In addition, alternate embodiment of the present invention may locate bit fields such as the DSZ bits in one or more separate registers. Also, different embodiments of the present invention may include any numbers of bits for each of the register bits fields illustrated in FIG. 3. Additionally, in some embodiments of the present invention, the control functionality of one or more of the register bit fields may be combined and encoded into fewer register bit fields.

FIG. 4-1 illustrates a first embodiment of circuitry comprising one of the integrated circuit terminals 126. An illustrated one of the plurality of integrated circuit terminals 126 includes an inverter 210, a NOR gate 212, a NAND gate 214, an inverter 216, a NAND gate 218, a transistor 220, a transistor 222, and a transistor 224. The Interface Control signal provides an EN_3_Volts signal to a first input of NAND gate 218 and a EN_3_Volts signal to a first input of NOR gate 212 and an input of inverter 210. Bus 61 provides a Data_In signal to a second input of NOR gate 212 and a first input of NAND gate 214. An output of inverter 210 is coupled to a second input of NAND gate 214. An output of NOR gate 212 is coupled to a second input of NAND gate 218 and a control electrode of transistor 222. An output of NAND gate 214 is coupled to an input of inverter 216. An output of inverter 216 is coupled to a control electrode of transistor 224. An output of NAND gate 218 is coupled to a control electrode of transistor 220. A first reference electrode of each of transistors 220 and 222 is coupled to a $V_{CC}$ reference voltage source. A second reference electrode of transistor 220 is coupled to a first reference electrode of transistor 224 and a second reference electrode of transistor 222 to provide a Data_Out signal via Data bus 62. A second reference electrode of transistor 224 is coupled to a $V_{SS}$ reference.

FIG. 4-2 illustrates a second embodiment of circuitry comprising one of the integrated circuit terminals 126. An illustrated one of the plurality of integrated circuit terminals 126 includes an inverter 310, a NOR gate 312, a NAND gate 314, an inverter 316, a NAND gate 318, a NOR gate 320, a transistor 322, a transistor 324, a transistor 326, and a transistor 328. The Interface Control signal provides an EN_Low_Energy signal to a first input of NAND gate 318 and in input of inverter 316. The Interface Control signal provides an EN_3 states signal to a first input of NOR gate 312 and an input of inverter 310. Bus 61 provides a Data_In signal to a second input of NOR gate 312 and a first input of NAND gate 314. An output of inverter 310 is coupled to a second input of NAND gate 314. An output of NOR gate 312 is coupled to a second input of NAND gate 318 and a control electrode of transistor 326. An output of NAND gate 314 is coupled to a first input of NOR gate 320 and a control electrode of transistor 328. An output of inverter 316 is coupled to a second input of NOR gate 320. An output of NOR gate 320 is coupled to a control electrode of transistor 324. An output of NAND gate 318 is coupled to a control electrode of transistor 322. A first reference electrode of each of transistors 322 and 326 is coupled to a $V_{CC}$ reference voltage source. A second reference electrode of transistor 322 is coupled to a first reference electrode of transistor 324, a second reference electrode of transistor 326, and a first reference electrode of transistor 328 to provide a Data_Out signal via Data bus 62. A second reference electrode of each of transistor 324 and transistor 328 is coupled to a $V_{SS}$ reference.

OPERATION OF THE PRESENT INVENTION

Operation of the present invention will now be discussed in greater detail. During operation of data processing system 15 illustrated in FIG. 1, data processor 10 may access data stored in either integrated circuit 50 or integrated circuit 52. Each of these external devices may require a different electrical interface. For example, in the example illustrated in FIG. 1, integrated circuit 50 may require voltage inputs having a minimum input voltage of 5 volts and integrated circuit 52 may require voltage inputs having a minimum input voltage of 3 volts. Stated another way, integrated circuit 50 may be implemented as a CMOS circuit which requires a maximum input voltage of 5 volts and integrated circuit 52 may be implemented as a TTL circuit which requires a maximum input voltage of 3 volts.

In a typical prior art implementation of such a data processing system, data processor 10 would be required to provide data having a minimum voltage level of 5 volts to both integrated circuit 50 and integrated circuit 52. The higher voltage level would then result in added power consumption for the system because power consumption is proportional to a square of a voltage value multiplied times capacitance and frequency (Power $CV^2f$). However, in the present embodiment of the invention, the integrated circuit terminals 126 are configured to communicate data having a voltage level which corresponds to an external device. For instance, in the example given above, system integration unit 22 will configure integrated circuit terminals 126 to provide data having a voltage level of 5 volts to integrated circuit 50 in response to the DA bits stored in a corresponding chip select register during a first access. Additionally, system integration unit 22 will configure integrated circuit terminals 126 to provide data having a voltage level of 3 volts to integrated circuit 52 during a second access in response to the DA bits stored in a corresponding chip select register. The configuration of integrated circuit terminals 126 is dependent on the external device accessed by data processor 10 and, therefore, may change on a timing cycle by timing cycle basis. By controlling the voltage drive level of data provided via integrated circuit terminals 126 using the DA bits in the plurality of control registers 94, the total voltage provided to all external devices is minimized. Therefore, the power consumed by data processing system 15 is also minimized.

While the embodiment of the invention described herein modifies the electrical interface provided by integrated circuit terminals 126 for transferring data, the present invention may also be applied to integrated circuit terminals which communicate both address and control information.

Before describing the present invention in greater detail, a general description of operation of data processing system 15 will be provided. In data processing system 15, each of the external devices is assigned an address range in a memory map of data processor 10. For example, integrated circuit 50 is enabled by a Chip Select1 signal 64 when data processor 10 accesses a first address range. When data processor 10 accesses an address within a second address range, a Chip Select signal 66 is asserted to enable integrated circuit 52.

Additionally, when one of integrated circuits 50 and 52 is accessed, an electrical interface provided by data processor 10 must be configured. The electrical interface of data processor 10 is determined by a driver attribute (DA) value stored in a chip select register stored in system integration unit 22 of FIG. 2. In the present embodiment of the invention, the driver attribute (DA) value is stored in the chip select register of the plurality of control registers 94 to indicate the electrical interface requirements of an external device which corresponds to the chip select register. By programming the driver attribute value in an internal register of data processor 10, the present invention provides for greater flexibility for configuring communication between a plurality of external devices and data processor 10. The flexible communication between data processor 10 and a plurality of external devices will subsequently be discussed in greater detail.

To begin discussing the electrical interface between data processor 10 and a remaining portion of data processing system 15, operation of data processing system 15 will be discussed. To implement the functionality of the present invention, the plurality of control registers 94 (as illustrated in FIG. 3) determine the driver attribute value, and therefore, a electrical configuration of a plurality of integrated circuit terminals, during external device access operations. The plurality of control registers 94 and the dynamic controllability of the driver attribute value will be subsequently discussed.

During operation of data processor 10, the plurality of control registers 94 (as illustrated in FIGS. 2 and 3) are written with control information prior to execution of a data processing operation which performs a memory access. Furthermore, during operation of data processor 10, CPU 12 is capable of initiating an external bus cycle. An external bus cycle is a bus cycle that is driven external to data processor 10 via Address bus 60 and Data bus 62. CPU 12 initiates an external bus cycle by driving an address value, a corresponding data value, and appropriate control signals on bus 24.

Referring to FIG. 2, compare circuitry 101 receives the address value from bus 24 and a plurality of address range bits (not illustrated herein) of one of the plurality of control registers 300 and 400 of control registers 94. Compare circuitry 101 then determines an address range associated with the received address value. In one embodiment of the present invention, compare circuitry 101 compares at least a portion of the address value from bus 24 to each set of address range bits provided by the plurality of control registers 94. In the present invention, address bits [31:15] are provided by each of the plurality of control registers 94. However, in alternate embodiments of the present invention, the plurality of address range bits may use any method and any number of bit fields to specify an address range.

Compare circuitry 101 then transfers Match signals 121 to control circuitry 102. Match signals 121 indicate which address range and, therefore, which Chip Select signal and which one of the plurality of registers 300 through 400 of the plurality of control registers 94 (illustrated in FIG. 3) will be used to provide control information to control circuitry 102. Control circuitry 102 then provides control signals 118 to chip select generation circuitry 104 to select which of the plurality of Chip Select signals is to be asserted. Control circuitry 102 also sends control signals to the plurality of control registers 94 via conductors 122 to select which of the plurality of registers 300 through 400 will be selected.

For example, if the received address value is in a first address range specified by a first plurality of address range bits, control circuitry 102 will select a first control register of the plurality of control registers 94. When the first control register is selected, the first control register will provide a first driver attribute (DA) value to control circuitry 102 via signal 122. Similarly, if a second received address value is in a second address range specified a second plurality of address range bits, control circuitry 102 will select a second control register of the plurality of control registers 94. When the second control register is selected, the second control register will provide a second DA value to control circuitry 102. By dynamically providing the DA values in response to a value stored in one of the plurality of control registers 300 and 400 which is associated with a predetermined Chip Select signal, the data port size and the electrical interface may be dynamically modified on each memory access by data processor 10. Unlike prior art implementations, the present invention is able to determine an electrical interface with which a plurality of integrated circuit terminals will communicate information transferred via the data bus in a flexible manner which does not require a fixed electrical interface configuration when the external device is accessed. Furthermore, the present invention is able to determine the electrical interface configuration of the plurality of integrated circuit terminals on a cycle by cycle basis as different external devices with different interface requirements are accessed.

As previously mentioned, the plurality of control registers 94 will provide chip select control bits to control circuitry 102 via conductors 122. Control circuitry 102 also provides timing or other control information to bus coupling circuit 100 via the plurality of conductors 116 and the integrated circuit terminals 126 via the Interface Control signal. The information provided by control circuitry 102 to the integrated circuit terminals 126 via the Interface Control signal includes the DA value stored in an accessed one of the plurality of control registers 94. The DA value is provided to indicate an electrical interface configuration of integrated circuit terminals 126 that will be accessed during a data communication operation.

In FIG. 2, it should be noted that the plurality of terminals 124 provide bus 59 externally to data processor 10. The plurality of terminals 126 Data provide bus 61 externally to data processor 10 and the plurality of terminals 128 provide chip select signals 64 through 66 externally to data processor 10.

Upon receipt of the DA value, the plurality of integrated circuit terminals 126 are configured to provide an electrical interface which corresponds to the selected external device. For example, when the DA value is %000, the plurality of integrated circuit terminals 126 will communicate data having a voltage swing of 2 volts. Similarly, when the DA value is %001, the plurality of integrated circuit terminals 126 will communicate data having a voltage swing of 3 volts and when the DA value is %010, the plurality of integrated circuit terminals 126 will communicate data having a voltage swing of 4 volts. When the DA value is %011, the plurality of integrated circuit terminals 126 will communicate data having a voltage swing of 5 volts and when the DA value is %100, the plurality of integrated circuit terminals 126 will communicate data having a voltage swing of 6 volts.

Furthermore, when any one of the plurality of control registers 94 is accessed, the DA value stored therein configures the plurality of integrated circuit terminals 124 in a similar manner. For example, when a second device is accessed by an address value in a second address range, a second one of the plurality of chip select registers 94 provides a second DA value.

By programming the DA value stored in a one of the plurality of control registers 94, the user may configure the data processor 10 to communicate data having a voltage level of 5 volts, 3 volts, or any voltage required by the user depending on an external device which was accessed. Such flexibility allows a user to significantly reduce the power consumed by data processing system 15. Therefore, a system designer is not forced to choose between power consumption and the cost of accessed devices. In prior art applications, if a device is accessed infrequently and costs less at a higher voltage implementation, the system designer is forced to choose between power consumption and cost.

EXAMPLE OF OPERATION OF THE PRESENT INVENTION

A first example of the advantages of the present invention will be described herein. When a Chip Select1 signal 64 is asserted to indicate that integrated circuit 50 is to be accessed, a first one of the plurality of control registers 94 is accessed. The DA bits accessed from the first one of the plurality of control registers 94 have been previously set to a value of %001 such that the plurality of integrated circuit terminals 126 are configured to provide data to integrated circuit 50 at a 3 volt level. When the DA bits are accessed from the first one of the plurality of control registers 94 and transferred to control circuitry 102 via bus 122, control circuitry 102 generates a plurality of Interface Control signals in response thereto. The plurality of Interface Control signals include the EN_3_Volts signal and the En_3 States signal. When the En_3 States signal is asserted, the plurality of integrated circuit terminals 126 are "tri-stated" such that outputs thereof have a high impedance and do not transfer data. Additionally, when the EN_3_Volts signal is asserted and the En_3 States signal is negated, the plurality of integrated circuit terminals 126 provide data to integrated circuit 50 at a 3 volt level. The 3 volt level corresponds to a value of $V_{CC}$.

If, however, Chip Select2 signal 66 is asserted to indicate that integrated circuit 52 is to be accessed, a second one of the plurality of control registers 94 is accessed. Assume in this first example that integrated circuit 52 requires only a 2 volt level to operate. Since integrated circuit 52 only requires a 2 volt level, the DA bits accessed from the first one of the plurality of control registers 94 have been previously set to a value of %000 such that the plurality of integrated circuit terminals 126 are configured to provide data to integrated circuit 52 at a 2 volt level. When the DA bits are accessed from the second one of the plurality of control registers 94 and transferred to control circuitry 102 via bus 122, control circuitry 102 generates the plurality of Interface Control signals which will configure the plurality of integrated circuit terminals 126 to provide the data transferred by bus 61 at a voltage level which approximates 2 volts.

When the Data_Out signal should be provided at a 2 volt, rather than 3 volt level, the DA bits enable control circuitry to negate both the EN_3_Volts signal and the En_3 States signal. When both signals are negated, transistor 222 is activated such that the Data_Out signal is provided at a level equal to $V_{CC}$ less the threshold voltage, $V_{TN}$, of transistor 222. Because the threshold voltage, $V_{TN}$, of transistor 222 generally has an approximate value of 0.7 volts, the effect of enabling threshold 222 is to subtract 0.7 volts from the $V_{CC}$ value of 3 volts. As a result, the Data_Out signal is provided at a level fairly close to the lower voltage of 2 volts.

Figure 5:
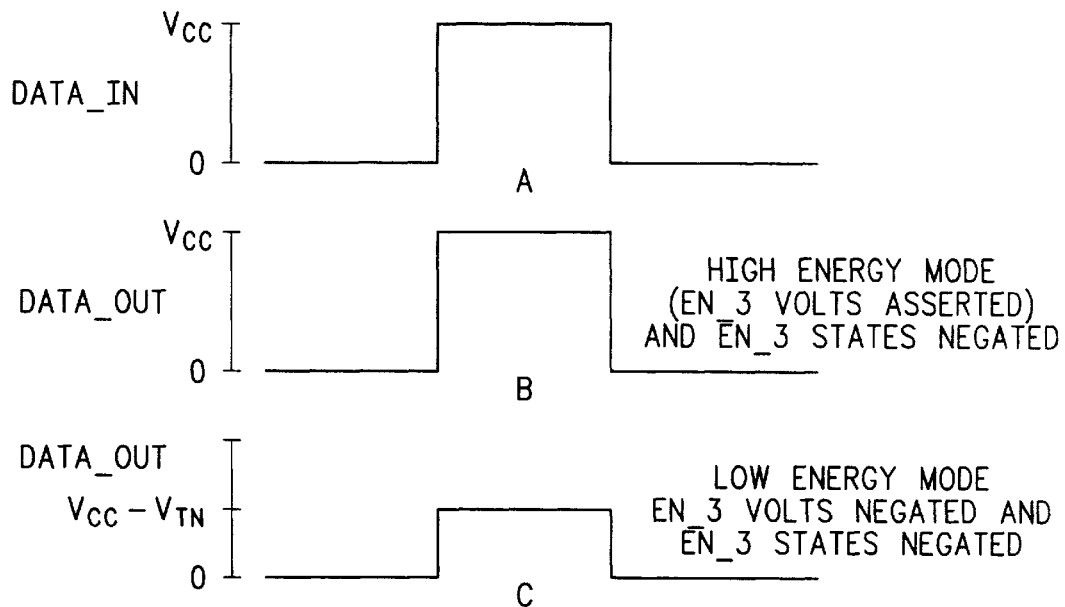
FIG. 5 illustrates in graphical form a first implementation of the variable voltage levels provided by the present invention.
Figure 6:
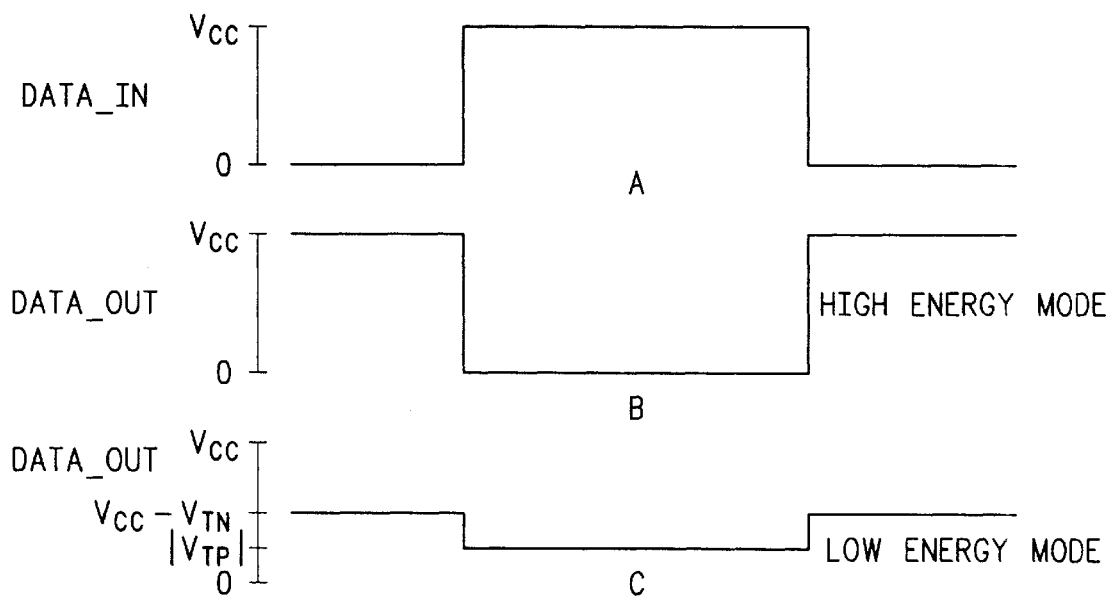
FIG. 6 illustrates in graphical form a second implementation of the variable voltage levels provided by the present invention.

A timing diagram illustrating the relative voltage levels provided by the circuit diagram of FIG. 4-1 is provided in FIG. 5. In a view A of FIG. 5, a data value is provided to the plurality of integrated circuit terminals 126 via the Data_In signal of bus 61 with a high voltage equal to $V_{CC}$. In a view B of FIG. 5, a timing diagram illustrates a High Energy Mode of operation of the plurality of integrated circuit terminals 126. When in the high energy mode of operation, the plurality of integrated circuit terminals provide data having a high voltage equal to $V_{CC}$. In the previous example describing an access of integrated circuit 50, the plurality of integrated circuit terminals 126 would operate in the high energy mode when providing data via the Data_Out signal of Data bus 62 at a voltage level of 3 volts. Conversely, view C of FIG. 6 illustrates a Low Energy Mode of operation of the plurality of integrated circuit terminals 126. When in the low energy mode of operation, the plurality of integrated circuit terminals provide data having a high voltage equal to $V_{CC}-V_{TN}$. In the previous example describing an access of integrated circuit 52, the plurality of integrated circuit terminals 126 would operate in the low energy mode when providing data via the Data_Out signal of Data bus 62 at a voltage level of approximately 2 volts.

By using the circuit illustrated in FIG. 4-1, power consumption is minimized because the voltage required to provide data is determined by the requirements of the accessed device. Therefore, as illustrated above, when the voltage level required for accessing a first device is less than that required for accessing a second device, the voltage level utilized by the plurality of integrated circuit terminals communicating the information may be lowered and is not fixed at the higher level as in prior art devices. Because power consumption is proportion to Capacitance, frequency, and a square of a voltage ($CV^2f$), minimizing the voltage results in a significant decrease in the power consumed by a circuit. The present invention provides a method for controlling a voltage level of the data provided by the plurality of integrated circuit terminals on an access by access basis such that power consumption may be minimized, while the functionality of the system is not adversely effected. Stated another way, when accessed, the devices external to the data processor which implement the present invention will still receive data at voltage levels required by the external device. A designer will have wide latitude in using various components in a data processing system and is not required to use devices having the same input voltage requirements. One should note, however, that if two devices are sharing the same bus in a data processing system, a device requiring a lower voltage must still be tolerant of the higher voltages required by other devices.

A second example of the advantages of the present invention will now be described herein. When a Chip Select1 signal 64 is asserted to indicate that integrated circuit 50 is to be accessed, a first one of the plurality of control registers 94 is accessed. The DA bits accessed from the first one of the plurality of control registers 94 have been previously set to a value of %011 such that the plurality of integrated circuit terminals 126 are configured to provide data to integrated circuit 50 at a 5 volt level. When the DA bits are accessed from the first one of the plurality of control registers 94 and transferred to control circuitry 102 via bus 122, control circuitry 102 generates a plurality of Interface Control signals in response thereto. The plurality of Interface Control signals include the En_Low_Energy signal and the En_3 States signal. When the En_3 States signal is asserted, the plurality of integrated circuit terminals 126 are "tri-stated" such that outputs thereof have a high impedance and do not transfer data. Additionally, when the En_Low_Energy signal is asserted and the En_3 States signal is negated, the plurality of integrated circuit terminals 126 provide data transferred by Data Bus 62 to integrated circuit 50 at a 5 volt level. The 5 volt level corresponds to a value of $V_{CC}$.

If, however, Chip Select2 signal 66 is asserted to indicate that integrated circuit 52 is to be accessed, the second one of the plurality of control registers 94 is accessed. Assume in this second example that integrated circuit 52 only requires a 3 voltage swing to operate. Since integrated circuit 52 requires only a 3 voltage swing to operate, the DA bits accessed from the first one of the plurality of control registers 94 have been previously set to a value of %001 such that the plurality of integrated circuit terminals 126 are configured to provide data to integrated circuit 52 having a 3 voltage swing. When the DA bits are accessed from the second one of the plurality of control registers 94 and transferred to control circuitry 102 via bus 122, control circuitry 102 generates the plurality of Interface Control signals which will configure the plurality of integrated circuit terminals 126 to provide the data transferred by bus 61 at a voltage level which approximates 3 volts.

When the Data_Out signal should be provided at a 3 volt, rather than 5 volt level, the DA bits enable control circuitry to negate both the En_Low_Energy signal and the En_3 States signal. When both signals are negated, transistors 326 and 328 are activated such that the Data_Out signal is provided having a lower voltage level of $V_{SS}+|V_{TP}|$ and an upper level equal to $V_{CC}-V_{TN}$. The $V_{TP}$ value is determined by a threshold voltage of transistor 328 and the $V_{TN}$ value is determined by a threshold voltage of transistor 326. Because the threshold voltage, $V_{PN}$, of transistor 328 generally has an approximate value of 0.7 volts, the effect of enabling threshold 328 is to add 0.7 volts from the $V_{SS}$ value of 0 volts. Furthermore, because the threshold voltage, $V_{TN}$, of transistor 326 generally has an approximate value of 0.7 volts, the effect of enabling threshold 326 is to subtract 0.7 volts from the $V_{CC}$ value of 5 volts. As a result, the Data_Out signal has a voltage swing of approximately 3 volts.

A timing diagram illustrating the relative voltage levels provided by the circuit diagram of FIG. 4-2 is provided in FIG. 6. In a view A of FIG. 6, a data value is provided to the plurality of integrated circuit terminals 126 via the Data_In signal of bus 61 with a high voltage equal to $V_{CC}$. In a view B of FIG. 6, a timing diagram illustrates a High Energy Mode of operation of the plurality of integrated circuit terminals 126. When in the high energy mode of operation, the plurality of integrated circuit terminals provide data having a high voltage equal to $V_{CC}$. In the previous example describing an access of integrated circuit 50, the plurality of integrated circuit terminals 126 would operate in the high energy mode when providing data via the Data_Out signal of Data bus 62 at a voltage level of 5 volts. Conversely, view C of FIG. 6 illustrates a Low Energy Mode of operation of the plurality of integrated circuit terminals 126. When in the low energy mode of operation, the plurality of integrated circuit terminals provide data having a high voltage equal to $V_{CC}-V_{TN}$ and a low voltage equal to $V_{CC}+V_{PN}$. Therefore, when accessing integrated circuit 52, the plurality of integrated circuit terminals 126 would operate in the low energy mode when providing data via the Data_Out signal of Data bus 62 at a voltage level of approximately 3 volts.

Like the circuit illustrated in FIG. 4-1, in the circuit illustrated in FIG. 4-2, power consumption is minimized because the voltage required to provide data is determined by the requirements of the accessed device. As in the previous example, the circuit of FIG. 4-2 provides a method for controlling a voltage level of the data provided by the plurality of integrated circuit terminals on an access by access basis such that power consumption may be minimized, while the functionality of the system is not adversely effected. In the second implementation of the invention, the use of the "p-type" and "n-type" transistors results in a reduction of almost 2 volts from the $V_{CC}$ value. Therefore, the second embodiment of the present invention allows additional power consumption savings.

Note that the circuits illustrated in FIGS. 4-1 and 4-2 are provided as two implementations of the invention. However, the present invention is not limited to these two implementations. For example, a receiver may be implemented in a similar manner to the transmitters illustrated in FIGS. 4-1 and 4-2. Additionally, alternative circuits which perform similar functions may also be used. Furthermore, multiple transistors may be stacked such that a desired voltage drop is generated for low power applications. The voltage drop across a single transistor may also be manipulated to implementing semiconductor processing steps which either increase or decrease the threshold voltage values.

The previous example illustrates the flexible interface and integrated circuit terminal configuration of the present invention. As was illustrated above, external devices are not assigned or required to communicate with predetermined voltage levels. Rather, the user may program the plurality of control registers 94 to correlate to an appropriate external device or group of external devices such that all data bits are provided at a voltage level which is neither too high nor too low. Such flexibility allows a user to substantially reduce power consumption while maintaining optimal overhead.

The implementation of the invention described herein is provided by way of example only and many other implementations may exist for executing the function described herein. For example, the DA value in each of the plurality of control registers 94 may be expanded to include more bits and, therefore, provide for greater functionality. Furthermore, the DA value may be stored in a register which is not associated with a chip select for each of the plurality of external devices, but in a register or memory which is accessed independently of the chip select register.

While the present invention has been illustrated and described with reference to specific embodiments, further modifications and improvements will occur to those skilled in the art. It is to be understood, therefore, that this invention is not limited to the particular forms illustrated and that the appended claims cover all modifications that do not depart from the scope of this invention.

What is claimed is:

1. A data processor, comprising:
   a bus having a plurality of bus signals; and
   a system integration unit coupled to the bus, the system integration unit comprising:
   a plurality of terminals,
   a bus coupling circuit to couple the plurality of bus signals to the plurality of terminals, and
   a first control register containing a set of device attribute bits that selects one of a plurality of pairs of voltage levels as a selected pair of voltage levels, wherein:
   the plurality of pairs of voltage levels comprises a first pair of voltage levels selected by a first data attribute value and a second pair of voltage levels selected by a second data attribute value;
   each of the plurality of pairs of voltage levels includes a first voltage level and a second voltage level;
   a difference between the first voltage level and the second voltage level for each of the plurality of pairs of voltage levels forms a voltage swing;
   the first pair of voltage levels contains at least one voltage level different than the second pair of voltage levels; and
   the selected pair of voltage levels is applied to the bus.

2. The data processor of claim 1 further comprising:
   a plurality of control registers coupled to the control circuit for receiving a first control value, a first one of the plurality of control registers selectively providing the first data attribute value when the first control value is provided by a control circuit and a second one of the plurality of control registers selectively providing the second data attribute value when a second control value is provided by the control circuit.

3. The data processor of claim 2 wherein:
   the first control value corresponds to a first external device, and
   the second control value corresponds to a second external device.

4. The data processor of claim 2 wherein the first voltage level of the selected pair is less than five volts and the second voltage level is about zero volts.

5. The data processor of claim 1 wherein the first control register is a chip select register.

* * * * *